Figure 1:
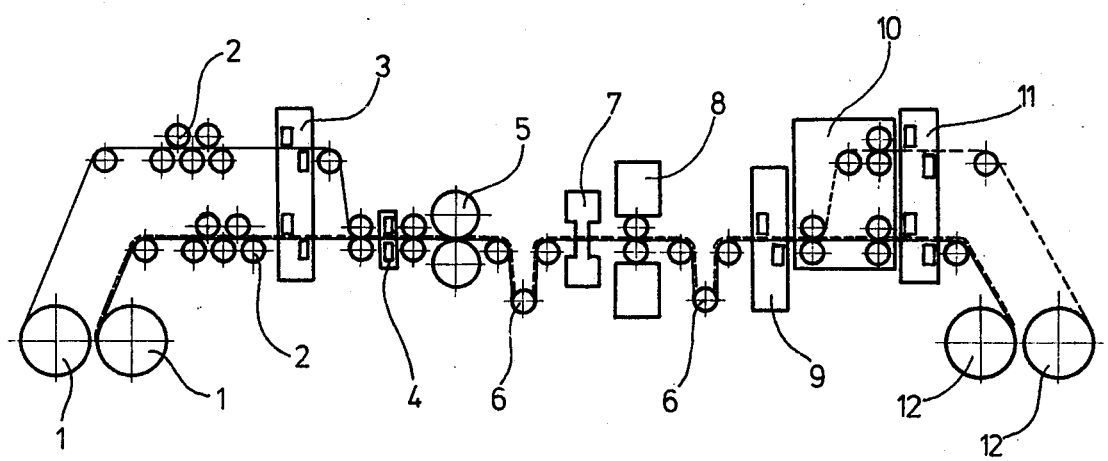

United States Patent [19]

Mitka et al.

[11] Patent Number: 4,461,419
[45] Date of Patent: Jul. 24, 1984

[54] AUXILIARY APPARATUS FOR MANUFACTURING STRIPS AND SHEETS, COATED ON ONE SIDE WITH A PROTECTIVE COATING

[75] Inventors: Boleslaw Mitka, Katowice; Tadeusz Prajsnar, Gliwice; Karol Mniszek, Zabrze; Wilhelm Gorecki, Gliwice; Franciszek E. Kolodziejczyk, Tarnowskie Gory; Jan Madry; Ryszard Kielpi ski, both of Katowice; Boguslaw Górecki, Myslowice; Kazimierz Kucharski, Katowice; Edmund Richta; Jan Maciejewski, both of wietochlowice, all of Poland

[73] Assignee: Instytut Metalurgii Zelaza IM. Stanislawa Staszica, Gliwice, Poland

[21] Appl. No.: 276,461

[22] Filed: Jun. 23, 1981

[51] Int. Cl.³ .............................................. B23K 37/00
[52] U.S. Cl. ...................................... 228/5.1; 228/47; 228/13; 228/191; 29/460; 29/426.3
[58] Field of Search .................. 228/5.1, 5.7, 47, 191, 228/13; 29/460, 426.1, 426.3, 527.2, 17 R

[56] References Cited

U.S. PATENT DOCUMENTS

| | | | |
|---|---|---|---|
| 3,224,088 | 12/1965 | McNelly | 29/460 |
| 3,274,679 | 9/1966 | Kennedy | 29/460 |
| 3,310,870 | 3/1967 | Parikh | 29/527.2 |
| 4,102,772 | 7/1978 | Nakamura | 204/206 |
| 4,114,563 | 9/1978 | Schedler | 118/63 |

FOREIGN PATENT DOCUMENTS 2738292  3/1979  Fed. Rep. of Germany .

Primary Examiner—Kenneth J. Ramsey
Assistant Examiner—Marc Hodak

[57] ABSTRACT

An apparatus which performs both the joining and the separating of juxtaposed strips to be coated including a stretcher leveller with two seam welders positioned between the entry and exit bridle rolls. Such an arrangement permits continuous stretch leveling of the juxtaposed strips during welding.

2 Claims, 2 Drawing Figures

AUXILIARY APPARATUS FOR MANUFACTURING STRIPS AND SHEETS, COATED ON ONE SIDE WITH A PROTECTIVE COATING

FIELD OF THE INVENTION

This invention relates to an auxiliary apparatus which makes possible to apply protective decorative or otherwise special coating on only one side of sheets or strips on conventional two-side coating lines.

BACKGROUND

Apparatus is well known for protective coating of sheets and strips on both sides by galvanizing, tinning aluminizing etc. Such apparatus consists of treatment lines comprising strip uncoilers, facilities for surface treating both sides before coating, facilities for applying the coating, facilities for finishing the coated materials and handling facilities for the coated strips or sheets. There are many classic examples of commercial two-sided coating production lines for galvanizing and aluminizing. However, on such conventional two side coating production lines, it is not possible to directly apply such protective coatings to only one side of the treated material. For single side coating such as galvanizing, special complex lines have to be designed, including different solutions for surface pretreatment, special adaptations for applying the zinc and special facilities for finishing the product. These adaptations for single coating are complicated as compared to the conventional two-sided coating apparatus.

For example, in order to apply on one side only of the ZINCROMET® protective coating, specified and widely used in the automotive industry utilizing DECROMET® primer, the line would require a special roll coater to apply the Decromet primer to only one side of the sheet surface; a special drying oven for said applied primed one side; a second roll coater for applying the Zincromet coating to the single primed surface; a second oven to heat treat this coating and also a cleaning machine to clean the uncoated surface, if necessary.

For the application of GALVA-ONE® electrolytically applied coating or the similarly applied UNIKO-TE® coating, would require special electrolytic production lines comprising baths for electroplating these coatings from appropriate baths with specially located and positioned electrodes and special electrical connections to the treated strip.

For the production of one side only hot dipped galvanized coatings on sheet or strip by the ZINCGRIP® coating method or the OGUS® coating procedure would require special bath arrangements for forming the stationary wave in the molten zinc for requisite control to coat one side of the sheet only, followed by special washing apparatus for the one side coated strip or sheet.

As can be seen, such modified apparatus for single side coating is very expensive due to its complexity and because of its special nature, having only a single use, is not commercially available.

Polish patent application No. 217,065 filed in 1979 is directed to a method of single side protective coating with conventional coatings of zinc, aluminum or tin. That method relates to uncoiling and parallelly juxtaposing two strips and then passing said strips through a coating bath under such a front-tension and back-tension at the entry and exit of the coating bath that a tight contact of juxtaposed strips is obtained, making it impossible for the bath to enter between said strips.

With this method of No. P. 27065, it is not always possible to obtain a sufficiently tight contact between the strips to exclude the bath. However, based on the principles of No. P. 27065, a further development is possible wherein after juxtaposing the two strips the adjacent edges are joined by welding or other durable joining means thus obtaining a durably joined double strip. The double strip is then conventionally pretreated on both sides as a single strip and is then conventionally continuously coated on both sides, e.g. by dip galvanizing. As a result a two sided galvanized double strip is obtained. This double strip composite consists of two strips each coated on only one side. This doubled strip is then finished by separating into two separate strips by trimming along the joined edges. As can be seen, this method permits achieving the same result as with the present invention by continuous discrete operations but this patent does not reveal any specific apparatus for realizing the results.

THE INVENTION

The present invention is directed to an auxiliary apparatus to be used in conjunction with conventional two-side protective coating lines to obtain therefrom single side coated strip or sheet.

The auxiliary apparatus of the present invention comprises conventional elements or components such as coilers, uncoilers, guides, welding machines, straighteners, shears and drying facilities specifically arranged to work in conjunction with conventional two-sided coating machines to yield single side coated sheet or strip.

Figure 2:
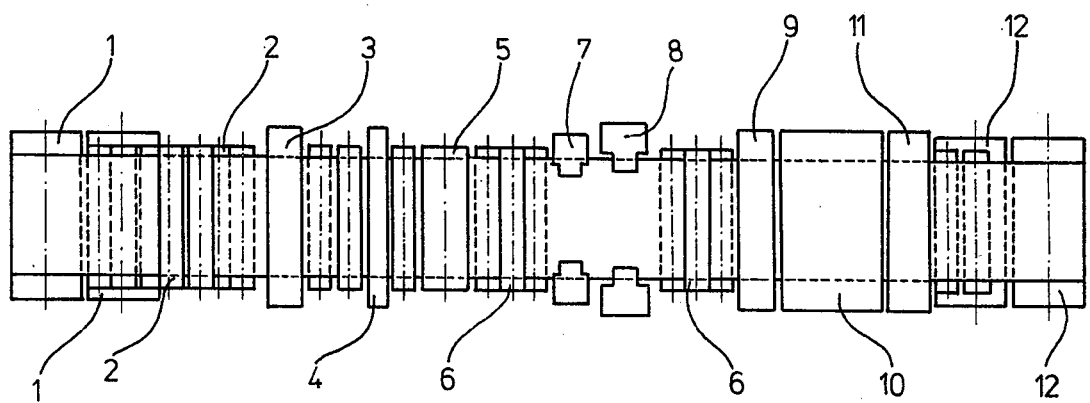

This invention will be more specifically disclosed and explained based upon an example of such an auxilliary apparatus as shown in the Drawing wherein FIG. 1 presents schematically a side view of this auxiliary line apparatus and FIG. 2 is a top view of this line auxiliary. This auxiliary apparatus consists of two uncoilers 1, two roller straighteners 2, a double shear 3 for cross cutting, a seam welder 4 for cross welding, a slitting shear 5, a stretcher leveler 6, two spot welding machines 7, two seam welders 8 for side welding of the strip, a cross cutting shear 9, a cleaning machine 10, a double cross cutting shear 11, and two coilers 12.

The operation of the above detailed auxiliary apparatus is as follows:

Two steel sheet coils to be galvanized or otherwise coated on one side only are positioned on uncoilers 1 and when uncoiled each strip is guided through roll straighteners 2, and then cropped by double shear 3. The cut ends of both sheets are overlapped, aligned and cross welded by welder 4. The aligned sheets pass through open shear 5 to stretcher leveler 6. The aligned sheets in tension in the leveler 6 are spot welded by spot welder 7 along the edges thereof to insure alignment and the entire edges of the double sheets or strip are welded by seam welder 8 to form the doubled unitary strip. This doubled strip is then fed to the coiler 12. This resulting coil of doubled strip is then ready for feeding the conventional coating machine. During this phase of the operation the following components of the apparatus of this invention are held in the inoperative condition; slitting shear 5, cleaning machine 10, and one of the coilers 12. Shears 9 or 11 are used for cross-cutting of the doubled strip to form and handle a coil from coiler 12.

The so-prepared doubled strip is then positioned in a conventional production type two-side coating line where the coating by any of the usual methods is applied to both sides in the same manner as for a single thickness strip. The resultant coated doubled strip is then coiled and the resulting coil is then fed back to the auxiliary apparatus of this invention as shown in FIGS. 1 and 2. In this phase of the process the coil of the coated doubled strip, coated on both sides thereof is positioned on one uncoiler 1 and uncoiled. The strip—following the path of the dotted line in FIG. 1—passes through roll straightener 2 and shear 3 where the strip end is cropped. The strip is then fed through shear 5 for trimming away of the welded seam. After the trimming of the weld, the doubled two-side coated strip becomes two one-side coated strips. Each resultant strip is then guided through the stretcher leveler 6 and then the strips are separated for cleaning of the uncoated surface. The clean separated strips are then coiled into two coils on coilers 12. During this second phase of operation, after the coating, the following components of the apparatus are not operative: welders 7 and 8; one of the uncoilers. The shears 9 and 11 are in intermittant use; shear 9, when necessary to remove defects in the coated sheet and shear 11, to cut the strip when the coils on coilers 12 are completed.

The advantage of the auxiliary apparatus according to this invention are its simplicity and adaptability, particularly for use in obtaining the single-side coated sheet or strip from doubled two-side coated sheet or strip, particularly according to the aforesaid Polish patent.

We claim:

1. An auxiliary apparatus for the production of one side coated steel sheet with a coating, selected from the group consisting of protective, decorative or special coatings, comprising uncoilers, shears, welders and coilers wherein the material flow line of the strip between uncoilers positioned at the beginning of the apparatus, and coilers positioned at the end of the installation, includes means for juxtaposing two strips in a face to face relationship, two seam welders for seam welding of the sides of the two juxtaposed strips, and a stretcher leveler for the continuous stretch leveling of the juxtaposed strips during welding, said seam welders being positioned between entry and exit bridle rolls of said stretch leveler.

2. An apparatus according to claim 1 wherein between the uncoilers and the coilers, the material flow line comprises a slitting shear for side trimming of the welded one-side coated double-strip, and positioned in front of the two seam welders and the stretcher leveler.

* * * * *